United States Patent [19]

Ollivier

[11] Patent Number: 5,458,001

[45] Date of Patent: Oct. 17, 1995

[54] GAS PRESSURE REGULATOR, DIAPHRAGM ASSEMBLY THEREFOR AND METHOD OF MAKING SAME

[75] Inventor: Louis A. Ollivier, Palo Alto, Calif.

[73] Assignee: Veriflo Corporation, Richmond, Calif.

[21] Appl. No.: 114,060

[22] Filed: Aug. 31, 1993

[51] Int. Cl.[6] .............................. G01L 7/08; F16K 31/12
[52] U.S. Cl. ................................................ 73/715; 251/54
[58] Field of Search ................................ 73/715; 251/50, 251/54; 137/557, 630, 498

[56] References Cited

U.S. PATENT DOCUMENTS 2,284,707   6/1942   Wilson ........................................ 73/715
3,800,736   4/1974   Krohn ......................................... 73/715

Primary Examiner—Richard E. Chilcot, Jr.
Assistant Examiner—William L. Oen
Attorney, Agent, or Firm—Antonelli, Terry, Stout & Kraus

[57]   ABSTRACT

A gas pressure regulator and a diaphragm assembly therefor and a method of assembling the regulator utilizing the diaphragm assembly which enable the precise alignment of a diaphragm and a valve carried thereby with respect to a valve seat for improved regulator performance with predictable relatively low hysteresis and creep, and improved reproducibility in a regulator of relatively small size.

9 Claims, 2 Drawing Sheets

GAS PRESSURE REGULATOR, DIAPHRAGM ASSEMBLY THEREFOR AND METHOD OF MAKING SAME

FIELD OF THE INVENTION

The present invention is an improved diaphragm assembly for a gas pressure regulator, a method of assembling a gas pressure regulator utilizing the diaphragm assembly, and the resulting gas pressure regulator which has predictable, improved performance for regulating the flow of pressurized gas.

BACKGROUND

The performance of a gas pressure regulator may be defined by four principal characteristics of the regulator. Namely its flow curve, hysteresis, creep and reproducibility. The flow curve of a regulator expresses the regulator's ability to maintain the outlet pressure of the regulator as the outlet flow changes. Hysteresis refers to the ability of the regulator to maintain the outlet pressure whether the flow is increased from a lower value to a new value or the flow is decreased from a higher value to that new value.

The creep of a pressure regulator, also known as "lock-up", is the ability of the regulator to maintain the outlet pressure as the flow is decreased from a small value to a no-flow condition. The reproducibility of a pressure regulator is an indication of its ability to return to the same operating outlet pressure as the flow goes from zero, the shutoff condition, to the operating steady state value.

It is desirable that the size of a gas pressure regulator, particularly its width, be made as compact as possible so that the regulator occupies minimal space. For example, a plurality of regulators may be arranged side by side in a row in a gas control installation. For a finite row length, which may be determined by existing cabinet size, the proximity of surrounding apparatus, etc., a greater number of pressure regulators can be accommodated if the width of the regulators can be reduced.

SUMMARY OF THE INVENTION

It has been found that the performance of a pressure regulator can be enhanced by a design which provides a diaphragm assembly which has a low spring rate. A lower spring rate results in a higher gain; that is, it takes less change in outlet pressure to open the valve seat passage to give a higher flow. This improves the flow curve. Performance is also enhanced where the diaphragm and valve carried thereby, and the valve seat are aligned precisely. This minimizes any side friction between the valve and valve seat and insures that the slightest change in outlet pressure will result in a corresponding deflection of the valve in relation to the valve seat. Precise alignment will decrease hysteresis and creep of the pressure regulator and improve reproducibility.

An object of the present invention is to provide an improved diaphragm assembly for a gas pressure regulator and a gas pressure regulator utilizing the diaphragm assembly wherein there is precise alignment of the diaphragm and valve with the valve seat. An additional object is to provide a method of assembling a gas pressure regulator which achieves this precise alignment.

A further object of the invention is to provide an improved gas pressure regulator which includes a diaphragm assembly with low spring rate components, e.g. diaphragm, bias spring and setting spring for improving the flow curve of the regulator.

The precise alignment of the diaphragm and valve with the valve seat is obtained through a sequence of operations including centering or precisely locating the valve seat in a cavity or recess of a valve body of the regulator, and centering or aligning the diaphragm and valve within a backup plate of the regulator which in turn, is centered or aligned with respect to the valve seat. The aligning or centering preferably takes place automatically during assembly according to the method of the invention.

More particularly, the improved method of the invention of assembling a gas pressure regulator including a valve seat having a passage therethrough for gas flow through the regulator, a movable diaphragm and a valve connected to the movable diaphragm for movement therewith in a direction towards and away from the valve seat for adjustably opening and closing the passage through the valve seat, comprises the steps of fixing the position of the valve seat in the regulator, aligning the movable diaphragm and valve connected thereto with respect to the passage through the valve seat, and sealingly clamping an outer peripheral portion of the aligned diaphragm between first and second clamping members of the regulator.

A disclosed, preferred embodiment of the method of assembling further includes providing respective alignment surfaces on an aligning member carried by the movable diaphragm and another reference member of the gas pressure regulator. The alignment surfaces are inclined with respect to the direction of the movement of the diaphragm. The aligning step includes moving the diaphragm such that the alignment surface of the aligning member is pressed against and slides relative to the alignment surface on the another reference member shift the diaphragm and valve in a direction transverse to the direction of movement of the diaphragm and valve for aligning the valve and movable diaphragm with respect to the passage through the valve seat. The first clamping member serves as the reference member in the disclosed embodiment. The diaphragm can slide between the first and second clamping members during the aligning step since the diaphragm is not sealingly clamped with a high force by the clamping members during the aligning.

The diaphragm assembly of the invention comprises a flexible diaphragm and a relatively rigid member in the form of a diaphragm plate connected to the diaphragm for movement therewith. A valve having a valve stem is connected to the diaphragm plate for movement therewith so that the valve can be moved in the regulator for adjustably opening and closing a gas passage in a valve seat in the regulator.

The diaphragm assembly further includes a first clamping member for sealingly clamping an outer peripheral portion of the flexible diaphragm when the diaphragm assembly is assembled in the pressure regulator. Also, an aligning member is mounted on the diaphragm plate of the assembly. The aligning member and the first clamping member are each provided with respective alignment surfaces which cooperate with one another when the diaphragm assembly is assembled in the pressure regulator for aligning the flexible diaphragm, diaphragm plate and valve with valve stem with respect to the first clamping member before the first clamping member is pressed to sealingly clamp an outer peripheral portion of the flexible diaphragm.

In the illustrated embodiment, the diaphragm assembly has, in addition a second clamping member in the form of a compression member. An outer peripheral portion of the flexible diaphragm is sealingly clamped against a radially outer portion of the compression member by the first clamping member, e.g. the backup plate when the diaphragm assembly is assembled in the pressure regulator.

Alignment of the flexible diaphragm, diaphragm plate, valve and valve stem with respect to the first clamping member is effective for aligning these members with respect to the passage through the valve seat to be adjustably throttled by the valve in that additional aligning surfaces are provided on the first and second clamping members, e.g. the backup plate, and the compression member. These additional aligning surfaces cooperate with one another for aligning the first and second clamping members with respect to one another with the outer peripheral portion of the flexible diaphragm loosely fitted therebetween so that the diaphragm can be shifted with respect to the first and second clamping members when the flexible diaphragm is aligned with respect to the first clamping member. The compression member further includes a cavity or recess for precisely locating the valve seat and the compression member with respect to one another. The valve body of the regulator is also formed with a recess or cavity for receiving a lower portion of the valve seat to precisely position the valve seat in the regulator. Thus, the valve body, valve seat, compression member and backup plate are each indexed with respect to one another such that the alignment surface on the backup plate establishes alignment of the diaphragm and valve with respect to the passage through the valve seat. The alignment surfaces are each inclined, preferably at an angle of 45°, so that a misaligned diaphragm and valve are shifted to a position where they are precisely aligned with the longitudinal axis of the passage of the valve seat.

A gas pressure regulator of the invention incorporating the described diaphragm assembly comprises a valve body having a passage for high pressure gas and a recess or cavity which receives and positions the valve seat of the assembly across the passage. The seat has a gas flow passage therethrough. The compression member presses the valve seat against the valve body. The compression member has a passage therethrough in communication with a passage through the valve seat. The valve adjustably opens and closes the passage in the valve seat. The valve has a valve stem which extends through the passage of the valve seat and also the passage of the compression member.

The pressure regulator further comprises a flexible diaphragm and a diaphragm plate connected to a central portion of the diaphragm for movement therewith. The valve stem of the valve is connected to the diaphragm plate for movement therewith so that the valve can be moved for adjustably opening and closing the gas passage through the valve seat. A backup plate sealingly clamps an outer peripheral portion of the flexible diaphragm between the backup plate and the compression member. The backup plate has an aperture therethrough. The diaphragm plate is formed with an extension which extends through the aperture in the backup plate.

An aligning stop member is mounted on the extension of the diaphragm plate. The aligning stop member and the backup plate are formed with respective inclined surfaces about the aperture through the backup plate. These inclined surfaces engage one another to stop the movement of the valve with respect to the valve seat in the full open, valve position. The inclined surfaces also function during assembly of the regulator for aligning the flexible diaphragm, diaphragm plate, valve stem and valve with respect to the backup plate and, in turn, the valve seat, before the diaphragm is sealingly clamped at an outer peripheral portion thereof between the compression member and the backup plate.

These and other objects, features and advantages of the present invention will become more apparent from the following description when taken in connection with the accompanying drawings, which show, for purposes of illustration only, one preferred embodiment in accordance with the present invention.

DETAILED DESCRIPTION OF THE DISCLOSED EMBODIMENT

Figure 1:
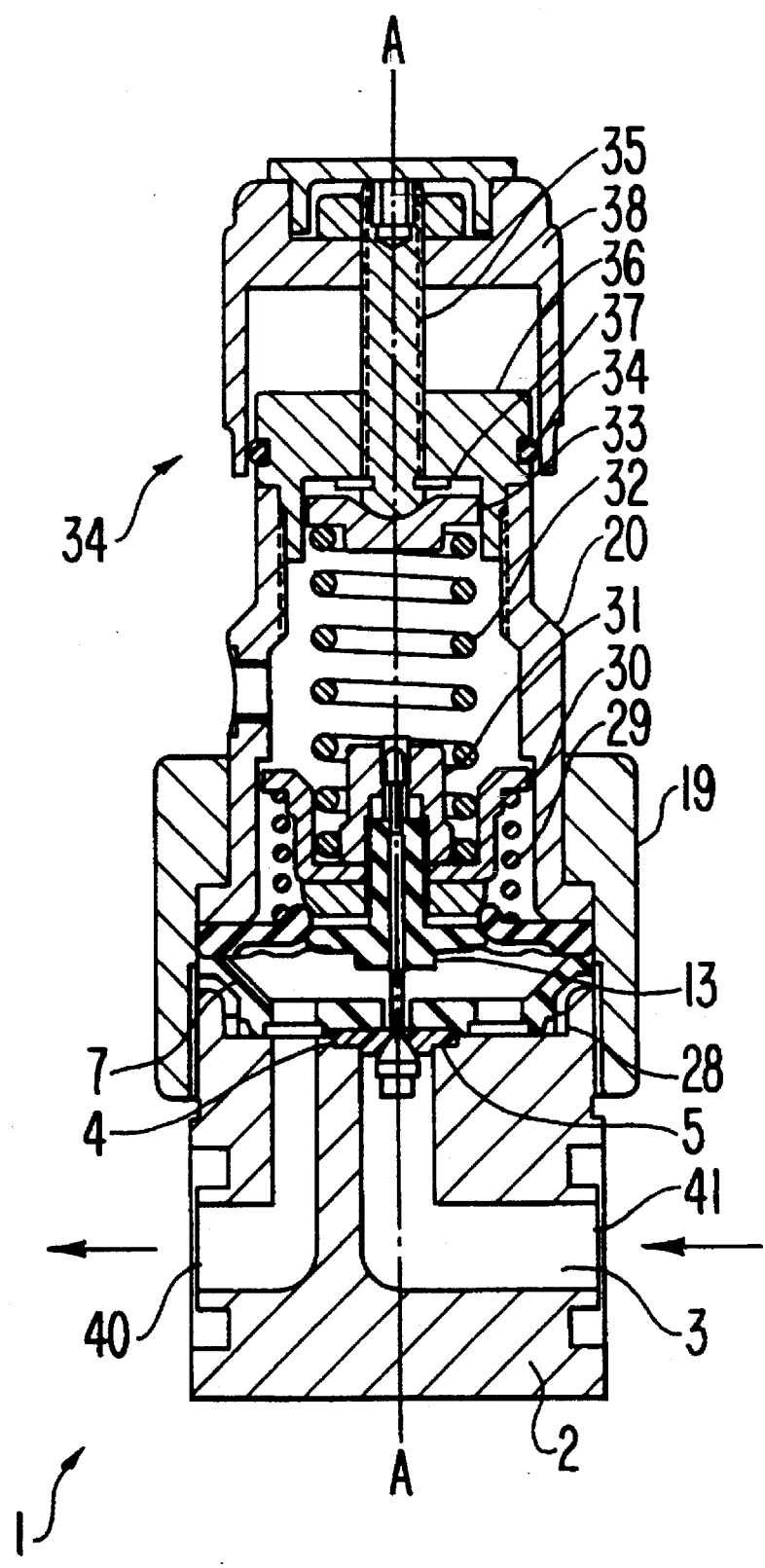
FIG. 1 is a cross sectional view, to a scale of 2:1, through a longitudinal section through the center of a gas pressure regulator according to a preferred embodiment of the invention.

Referring now to the drawings, a gas pressure regulator 1 according to the invention illustrated in FIG. 1 comprises a valve body 2 having a passage 3 therein for the entry of high pressure gas supplied to the regulator through inlet 41. A valve seat 4 is positioned on its lower side in a recess or cavity 5 in the valve body to orient or fix the valve seat on the central longitudinal axis A—A of the regulator. The annular valve seat has a central, circular passage extending therethrough. The axis A—A of the regulator passes through the center of the passage 6 when the valve seat is located in the recess 5.

An annular, dish-shaped compression member 7 presses the valve seat 4, at a lower central portion of the compression member, against the valve body 2 with a force to seal the valve seat against the valve body and the compression member. The valve seat is preferably formed of plastic. A fluorocarbon polymer, sold under the trademark Kel-F, is the valve seat material in the disclosed embodiment, but other materials could be employed. The central, lower side of the compression member is formed with an annular recess or cavity 9 in which the upper end of the valve seat 4 is positioned for centering the compression member with respect to the valve seat 4 and valve body 2 on the axis A—A. A central passage 10 is formed through the compression member and communicates with passage 6 through the valve seat 4.

A valve or poppet 11 is located adjacent the lower side of the valve seat 4. The valve has an upwardly directed, conically shaped surface which cooperates with the valve seat about its passage 6 for adjustably opening and closing the passage to regulate the pressure of the gas pressure downstream of the valve at the outlet 40 of the regulator. The valve 11 includes a valve stem or poppet extension 12 which extends upwardly along the axis A—A of the regulator through the passage 6 of the valve seat and passage 10 of the compression member 7 to a diaphragm plate 13. The valve stem is connected to the diaphragm plate by screw threads 14 on the upper end of the valve stem and complementary screw threads at the upper end of a central, axially aligned passage 15 in the diaphragm plate 13. The diaphragm plate 13, in turn, is connected as by welding to a central portion of an annular, flexible metal diaphragm 16.

The outer peripheral portion of the annular diaphragm 16 is sealingly clamped between an annular, upper surface of the compression member 7 and a lower, outer surface in a cylindrical recess or cavity 17 of backup plate 18. The lower side wall of the cylindrical recess 17 of backup plate 18 closely fits over and receives the upper, annular end of the compression member 7 for centering the backup plate on the axis A—A of the regulator. A nut 19 is threadedly received on the valve body 2 and engages the lower flange of a cap 20 to maintain a clamping force on the flange of the cap 20, backup plate 18, the outer periphery of diaphragm 16 and compression member 7 against the valve body 2. The lower surface of the compression member 7 forms a metal-to-metal seal against the upper surface of the valve body 2. A gasket 28 located between the compression member and the valve body forms a backup seal against leakage of gas flowing through the regulator.

The backup plate 18 has a central aperture or passage 21 therethrough which is bounded by an upstanding annular flange 22. An upwardly extending extension 23 of diaphragm plate 13 extends through the aperture 21 of the backup plate. The extension 23 is cylindrical and has screw threads formed on its outer surface. An annular, aligning stop member 24 having a central threaded passage is threadedly connected on the extension 23 of the diaphragm plate. The aligning stop member 24 and the upstanding flange 22 of the backup plate 23 have respective inclined surfaces formed thereon in the manner of a segment of a cone centered about the axis A—A of the regulator. When the valve 11 contacts the valve seat 4 to close the passage 6 therethrough, the inclined surface 25 is spaced above the inclined surface 26 by a predetermined distance, 0.020 inch in the disclosed embodiment. With downward movement of the diaphragm, diaphragm plate and valve in an amount equal to this predetermined distance, the inclined surfaces 25 and 26 contact one another to limit or stop the downward movement.

As explained below, during assembly of the regulator, before the outer periphery of the diaphragm 16 is clamped between the backup plate and the compression member, the diaphragm is intentionally depressed to cause the inclined surfaces 25 and 26 to interact with one another to laterally adjust the position of the diaphragm, diaphragm plate and valve so that they are centered or aligned on the axis A—A through the passage in the valve seat using the inclined surface 26 as a reference surface. In the case of an initial misalignment of, for example 0.005 inch of the central axis of the diaphragm, diaphragm plate and valve with respect to the axis A—A, the inclined surface 25 will slide over the inclined surface 26 to cam or laterally shift the diaphragm, diaphragm plate and valve to align the axis thereof with the axis A—A of the passage through the valve seat. In this way, precise alignment of the diaphragm, diaphragm plate and valve with respect to the passage through the valve seat can be consistently achieved in the manufacture of pressure regulators for minimizing hysteresis and creep and improving reproducibility of the regulators.

Figure 2:
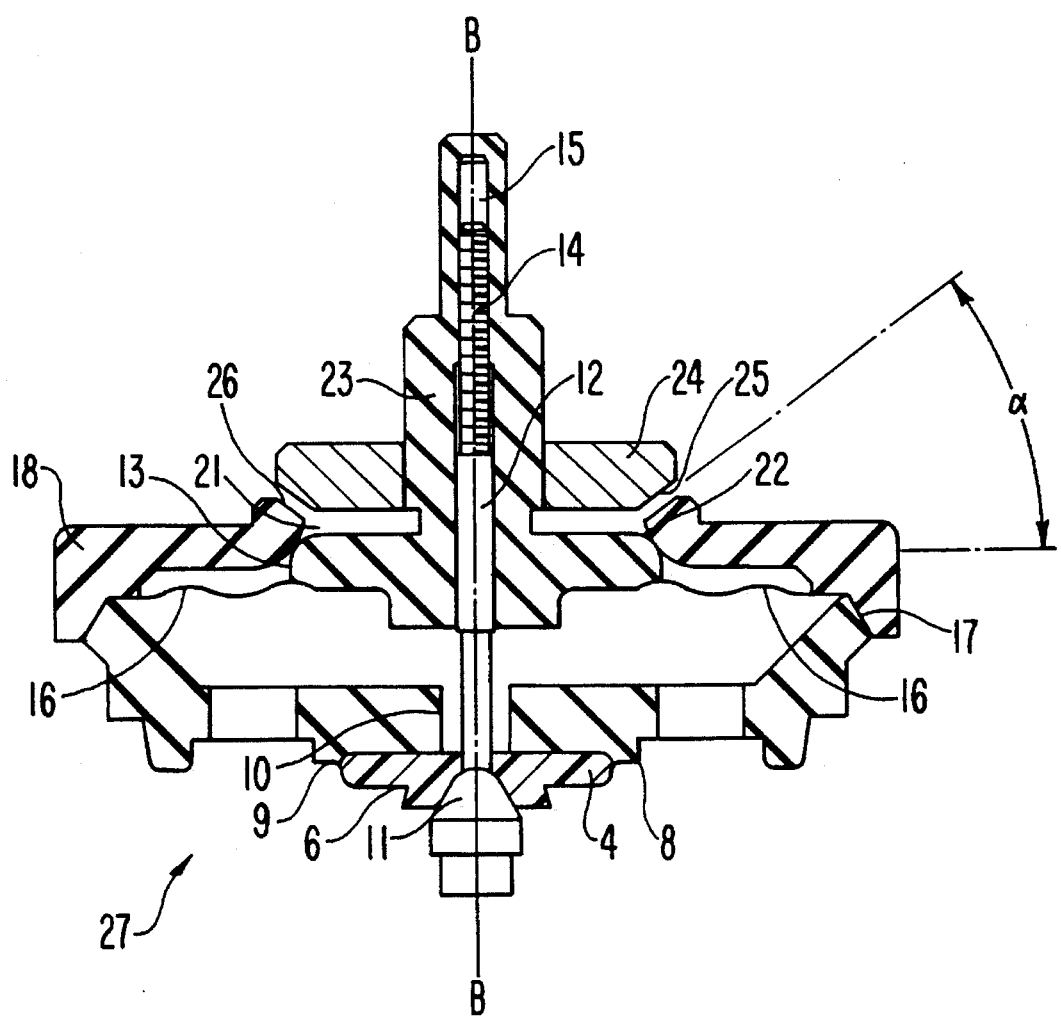
FIG. 2 is an enlarged view of the diaphragm assembly according to the invention which is utilized in the gas pressure regulator of FIG. 1.

The diaphragm assembly 27 which is used in the pressure regulator 1 is depicted in FIG. 2. In this assembly the outer peripheral portion of the diaphragm 16 is loosely fitted between the unclamped backup plate and the compression member. The valve stem 12 has been threaded into the passage 15 in the diaphragm plate 13 a desired amount to tension the diaphragm slightly downwardly, for example 0.015 inch from its initial neutral position. The aligning stop member 24 has also been threadedly connected on the outer surface of diaphragm plate extension 23 such that a predetermined vertical clearance, 0.020 inch in the illustrated embodiment, exists between the inclined surfaces 25 and 26 when the axis of the aligning stop member and that of the backup plate are coincident. The components of the subassembly can be held in a suitable fixture, not shown, to assist in assembling the components of the diaphragm assembly 27. More particularly, in the disclosed embodiment the following sequence of operations is employed to form a diaphragm assembly 27.

First, while supported in a fixture, the valve 11 is threaded into the passage 15 of the diaphragm plate 13 until the valve is one turn away from touching the valve seat 4. The valve seat supports the compression member 7 thereon as shown in FIG. 2 and, in turn, the diaphragm 16 and backup plate 18. The aligning stop member 24 is then threaded onto the extension 23 of the diaphragm plate so that it is one and one-half turns away from touching the backup plate. Thereafter, a downward pressure is applied on the diaphragm plate and diaphragm to bias them downwardly a distance of 0.016 to 0.018 inch along the axis B—B from its relaxed height.

The valve 11 is further threaded into the passage 15 of the diaphragm plate 13 so that it comes into contact with the valve seat 4. This condition can be determined by observing a deflection of 0.001 inch of the diaphragm plate along the axis B—B using a suitable indicator during turning of the valve 11 and its valve stem 12 relative to the diaphragm plate 13. Once the position of the valve 11 relative to the diaphragm plate 13 is set, an upper portion of the extension 23 of the diaphragm plate is crimped to fix the relative positions of the valve and diaphragm plate.

To determine whether the valve stem is properly crimped within the extension 23, the diaphragm plate can be slightly depressed to move the valve 11 away from the valve seat and a torque wrench attached to the valve. The valve should not rotate when a torque of 5 ounce inch is applied. The aligning stop member 24 is then rotated relative to the diaphragm plate for setting the opening limit of the valve to 0.020 inch. Marks are then applied to the aligning stop member and the extension 23 of the diaphragm plate to provide relative reference marks.

For installation of the diaphragm assembly 27 in the regulator, a gasket 28 is installed into the cavity of the valve body 2 and thereafter the diaphragm assembly 27 is set into the cavity of the valve body. A check is made that the correspondence of the reference marks on the aligning stop member and extension 23 is preserved. A bias spring 29 for urging the valve 11 in a direction to close the passage 6 through the valve seat, and a retainer 30 are installed as shown in FIG. 1. While holding the retainer 30 against the aligning stop member 24 such that the member firmly engages the backup plate in its stop position, a nut 31 is engaged with the extension 23 and tightened with a torque of 20 pound, inch. An assembly guide fixture, not shown, is then placed over the retainer and backup plate to verify the alignment of these components with respect to one another. Thereafter, a pressure setting spring 32 and a button 33 therefor are installed on the retainer 30 as shown in FIG. 1.

A cap assembly 34 is provided. The cap assembly comprises a stem 35 threadedly connected to a bushing 36, an E ring 37 installed on the lower end of the stem, and a knob 38 which is threadedly connected to the stem 35. An O ring 39 is located about the bushing 36. The cap assembly 34 is placed over the diaphragm assembly and the stem 35 is turned so that the pressure setting spring 32 keeps the flange at the lower end of the cap 20 approximately one-eighth inch above the backup plate.

The nut 19 is placed over the cap assembly and while the cap assembly is pushed against the backup plate to overcome the force of the spring 32, the nut 19 is screwed finger tight onto the valve body 2. During this operation, the force of the spring 32 keeps the aligning stop member 24 against the backup plate, thus providing automatic aligning of the diaphragm, diaphragm plate, valve stem and valve with respect to the valve seat and the axis A—A through the passage 6 om the valve seat. That is, the inclined surfaces 25 and 26 contact one another and slide relative to one another to achieve alignment during the downward pushing of the diaphragm plate by the pressure setting spring 32. Once the necessary centering or alignment operation is performed, the regulator assembly is placed in a clamping fixture and a clamping force (1000 to 2000 pounds) is applied to press the cap assembly against the backup plate, diaphragm, compression member and valve body. Then nut 19 is tightened onto the valve body 2 to maintain the clamping force.

Tests were conducted with the gas pressure regulator 1 of the invention to determine the creep, hysteresis and reproducibility of the regulator. In these tests, the low pressure outlet 40 of the regulator was connected to a test set up including a pressure gauge, 0–60 psi with minor division of 0.2 psi, and an adjustable metering valve. The outlet of the metering valve was connected to flow meters to read flows from 5 to 5,000 cubic centimeter per minute. The high pressure inlet port 41 of the regulator was connected to a supply source of clean nitrogen gas at a pressure adjustable from 30 to 100 psi.

To check creep and hysteresis, the inlet pressure was set at 30 psi and the outlet pressure of the regulator was set at 15 psi with a flow of 50 cc/min. The flow was changed progressively from 50 to 20 cc/min., then to zero (metering valve closed). The change in outlet pressure was read as the flow was reduced from 20 cc/min. to zero. The change (creep) was less than or equal to 0.8 psi in 30 seconds. With respect to hysteresis, the flow was changed from 0 to 100 cc/min. and the outlet pressure read. The flow was increased to 200 cc/min., and then decreased to 100 cc/min. and the outlet pressure was read. The difference between the two readings (at 100 cc/min.) was less than or equal to 0.4 psi.

The flow-pressure drop associated with the regulator was tested by maintaining an inlet pressure at 30 psi during the test and setting the outlet pressure at 15 psi with a flow of 50 cc/min. The flow was then decreased to zero; then increased to 20 cc/min. and the outlet pressure was read. The flow was then further increased from 20 to 2,000 cc/min. and the outlet pressure read. The difference between the two readings (pressure decrease) was less than or equal to 1.5 psi.

This enhanced performance of pressure regulators of the invention as determined by the test results was achieved in regulators having relatively small dimensions. In the disclosed embodiment the diameter or width of the regulator is less than 1.5 inches. In this regard the scale of the drawing of the regulator depicted in FIG. 1 is 2:1 as indicated above. However, the regulator need not be a small or precision regulator but the invention can be used to improve the performance of large commercial regulators as well.

While I have shown described one embodiment in accordance with the present invention, it is understood that the same is not limited thereto but is suspectable to numerous changes and modifications as known to those skilled in the art. For example, the angle of the inclined surfaces 25 and 26 could be other than 45° so long as the surfaces cooperate with one another to achieve the desired alignment of the diaphragm, diaphragm plate and valve with the axis A—A in the valve seat of the regulator. The valve body, compression member, backup plate, diaphragm and diaphragm plate in the illustrated embodiment are each formed of stainless steel while the aligning stop member is formed of a nickel-brass alloy, but other materials could be employed. The operation of the diaphragm in its flow regulating function involves a balancing of forces on the diaphragm from pressure setting spring 32, the bias spring 29 and the high pressure gas acting on the valve 11 as well as the lower pressure gas downstream thereof acting on the diaphragm and diaphragm plate as readily understood by the skilled artisan such that a further explanation of the manner of operation of the regulator has been omitted. Therefore, I do not wish to be limited to details shown and described herein but intend to cover all such changes and modification as are encompassed by the scope of the claims.

I claim:

1. A diaphragm assembly for a gas pressure regulator for regulating the flow of pressurized gas from a source of pressurized gas, said diaphragm assembly comprising:

a valve seat;

a flexible diaphragm arranged on one side of said valve seat for movement in a direction towards and away from said valve seat;

a relatively rigid member connected to a central portion of said diaphragm for movement therewith;

a valve arranged on another side of said valve seat opposite said one side, said valve having a valve stem which extends through a passage in said valve seat and is connected to said relatively rigid member for movement therewith so that said valve can be moved for opening the passage in the valve seat when the diaphragm is moved in the direction towards the valve seat and closing said passage in the valve seat when the diaphragm is moved in the direction away from the valve seat;

a first clamping member for sealingly clamping an outer peripheral portion of said flexible diaphragm when said diaphragm assembly is assembled in said pressure regulator;

an aligning member mounted on said relatively rigid member, said aligning member and said first clamping member having respective aligning surfaces which cooperate with one another when said diaphragm assembly is assembled in said pressure regulator for aligning said flexible diaphragm, said relatively rigid member and said valve stem and valve with respect to said first clamping member before said first clamping member sealingly clamps said outer peripheral portion of said flexible diaphragm;

a second clamping member against which said outer peripheral portion of said flexible diaphragm is sealingly clamped by said first clamping member when said diaphragm assembly is assembled in said pressure regulator;

additional aligning surfaces on said first and second clamping members which cooperate with one another for aligning said first and second clamping members with respect to one another with said outer peripheral portion of said flexible diaphragm loosely fitted therebetween so that said diaphragm can be shifted with respect to said first and second clamping members when said flexible diaphragm is aligned with respect to said first clamping members; and wherein said second clamping member has a recess receiving said valve seat for aligning said valve seat and said second clamping member with respect to each other.

2. The diaphragm assembly according to claim 1, wherein said first clamping member includes a passage extending therethrough through which said relatively rigid member extends.

3. The diaphragm assembly according to claim 1, wherein said aligning surfaces are inclined surfaces which extend about a passage through said first clamping member.

4. The diaphragm assembly according to claim 3, wherein said inclined surfaces are inclined at an angle of 45° with respect to said direction of movement of said diaphragm.

5. A gas pressure regulator for regulating the flow of pressurized gas supplied to the regulator from a source of pressurized gas, said regulator comprising:

a valve body having a passage for high pressure gas whose flow is to be regulated by said regulator and a recess for positioning a valve seat across said passage;

a valve seat located in said recess of said valve body and having a gas passage therethrough;

a compression member pressing said valve seat against said valve body, said compression member having a gas passage therethrough in communication with said gas passage of said valve seat;

a valve located in said passage of said valve body adjacent a first side of said valve seat, said valve being movable in a direction away from and towards said valve seat for adjustably opening and closing said gas passage through said valve seat, said valve having a valve stem which extends through said passage of said valve seat to a second side of said of said valve seat opposite said first side and through said passage of said compression member;

a flexible diaphragm located in spaced relation to said valve seat on said second side of said valve seat and said diaphragm being movable in said gas pressure regulator in a direction towards and away from said valve seat;

a diaphragm plate connected to a central portion of said diaphragm for movement therewith, said valve stem being connected to said diaphragm plate for movement therewith so that said valve can be moved for opening said passage through said valve seat when said diaphragm moves towards said valve seat and for closing said passage through said valve seat when said diaphragm moves away from said valve seat;

a backup plate sealingly clamping an outer peripheral portion of said flexible diaphragm between said backup plate and said compression member, said backup plate having an aperture therethrough, said diaphragm plate having an extension which extends through said aperture in said backup plate;

an aligning stop member mounted on said extension of said diaphragm plate, said aligning stop member and said backup plate having respective inclined surfaces about said aperture through said backup plate, which inclined surfaces are inclined with respect to said direction of movement of said flexible diaphragm and engage each other to stop the movement of the valve with respect to said valve seat in a fully opened valve position, and which inclined surfaces function during assembly of the regulator for aligning said flexible diaphragm, diaphragm plate and said valve stem and valve with respect to said valve seat passage before said flexible diaphragm is sealingly clamped between said compression member and said backup plate.

6. The gas pressure regulator according to claim 5, wherein said compression member has a recess which receives a portion of said valve seat such that said compression member is aligned with respect to said valve seat.

7. The gas pressure regulator according to claim 6, further comprising surfaces on said compression member and said backup plate which cooperate to align said backup plate with respect to said valve seat.

8. The gas pressure regulator according to claim 5, wherein said inclined surfaces are inclined at an angle of 45° with respect to said direction of movement of said diaphragm.

9. A method of assembling a gas pressure regulator for regulating the flow of pressurized gas supplied to the regulator from a source of pressurized gas, the regulator including a valve seat having a passage therethrough for gas flow through the regulator, a movable diaphragm located on one side of said valve seat and a valve located on another side of said valve seat opposite said one side, said valve being connected to said movable diaphragm by way of a valve stem of said valve and a diaphragm plate connected to said diaphragm, said movable diaphragm being movable in a direction toward and away from the valve seat so that said valve connected thereto adjustably opens and closes said passage through the valve seat, said method comprising fixing the position of said valve seat in said regulator, aligning the movable diaphragm, diaphragm plate, valve stem and valve with respect to the passage through the valve seat and sealingly clamping an outer peripheral portion of the aligned diaphragm between first and second clamping members of said regulator, and wherein said method includes providing respective alignment surfaces on an aligning member carried by said movable diaphragm and on said first clamping member, said alignment surfaces being inclined with respect to said direction of movement of said diaphragm, and said aligning step including moving said diaphragm such that the alignment surface of said aligning member is pressed against and slides relative to the alignment surface on said first clamping member to shift said diaphragm, diaphragm plate, valve stem and valve in a direction transverse to said direction of movement of said diaphragm and valve for aligning the valve, valve stem, diaphragm plate and diaphragm with respect to the passage through said valve seat.

* * * * *